Feb. 4, 1958 J. F. BAIER 2,822,076
CHARGE DISTRIBUTING MEANS FOR ROTATABLE DRUMS
Filed Jan. 26, 1956 5 Sheets-Sheet 5
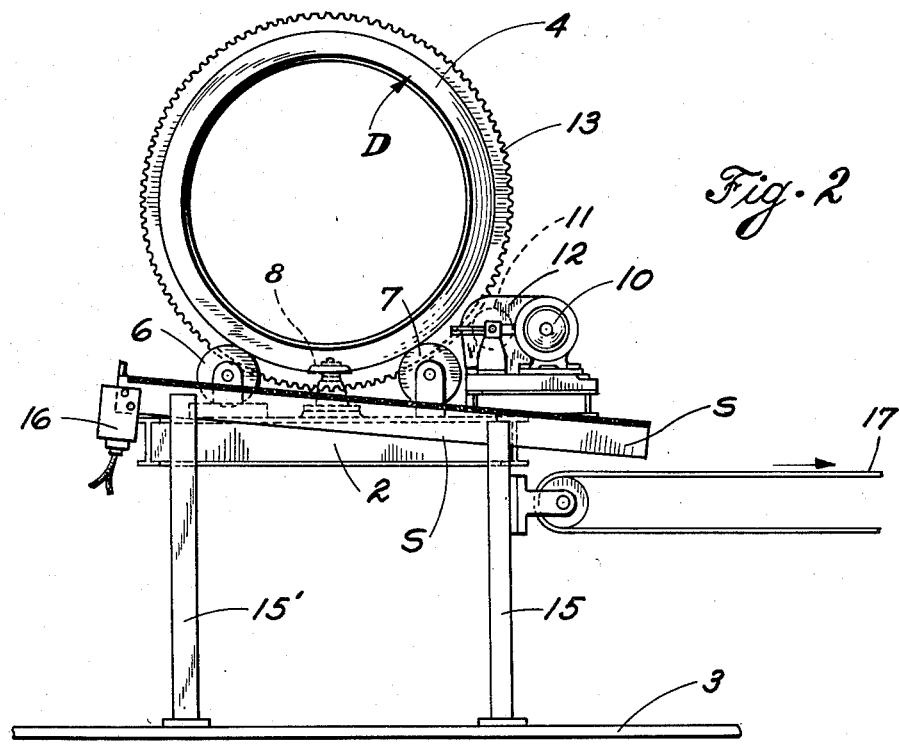
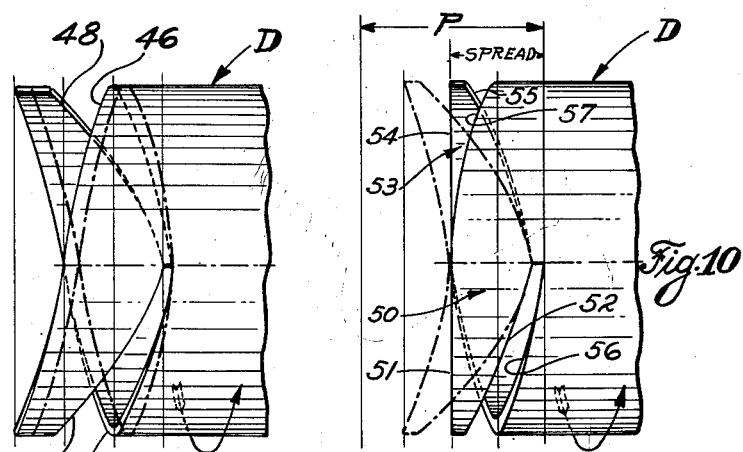
INVENTOR.
JOHN F. BAIER.
BY
ATTORNEYS United States Patent Office 2,822,076
Patented Feb. 4, 1958

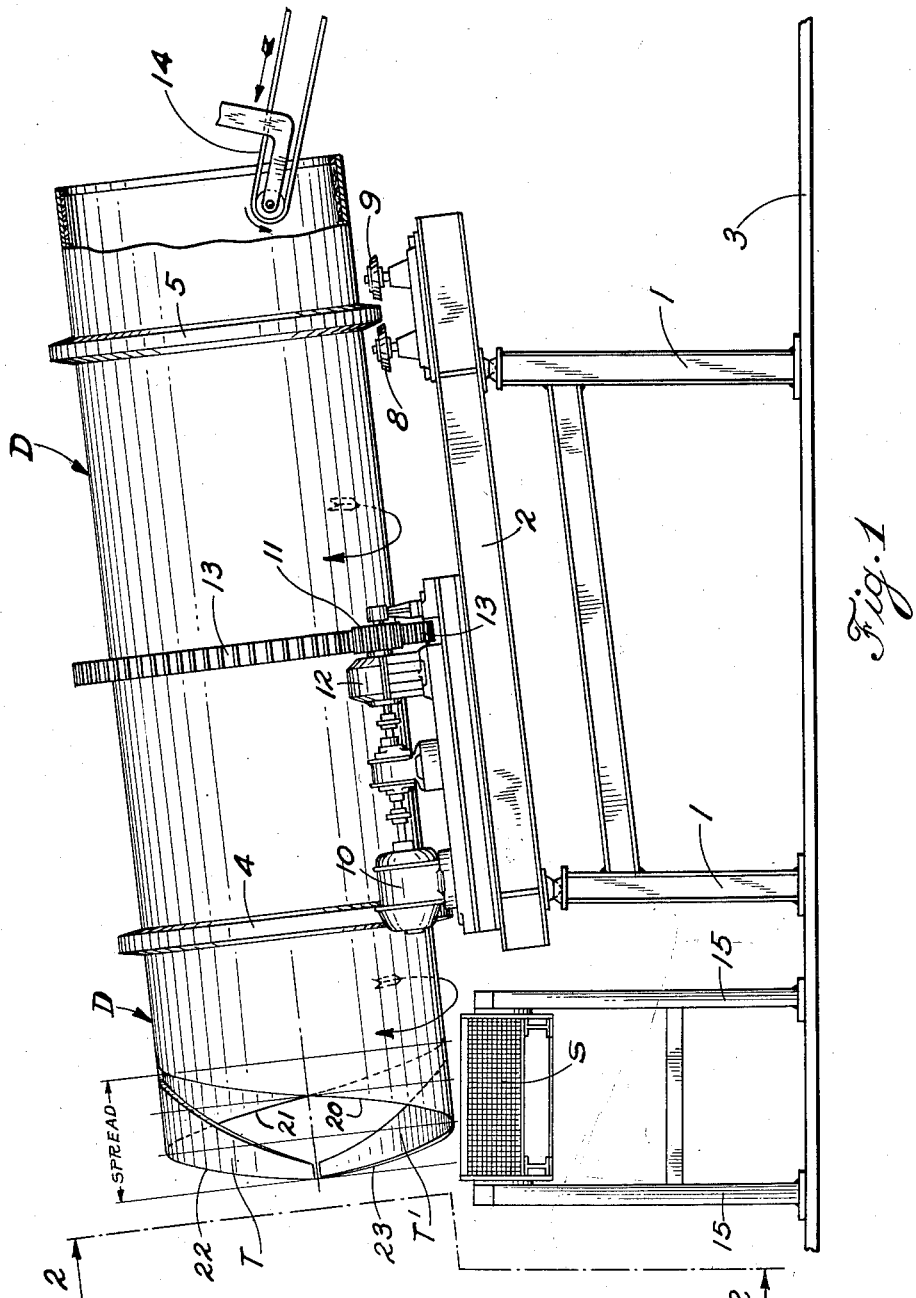

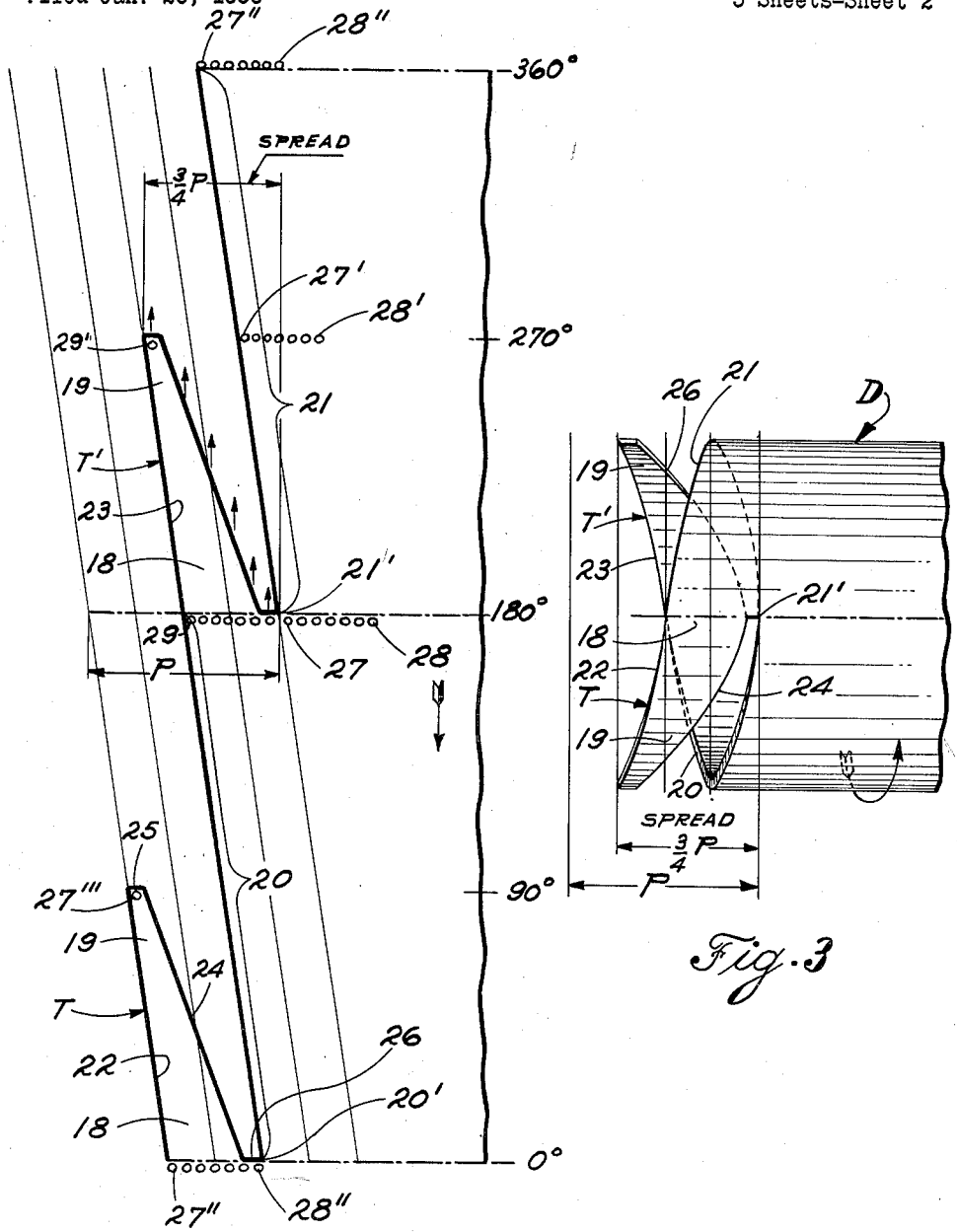

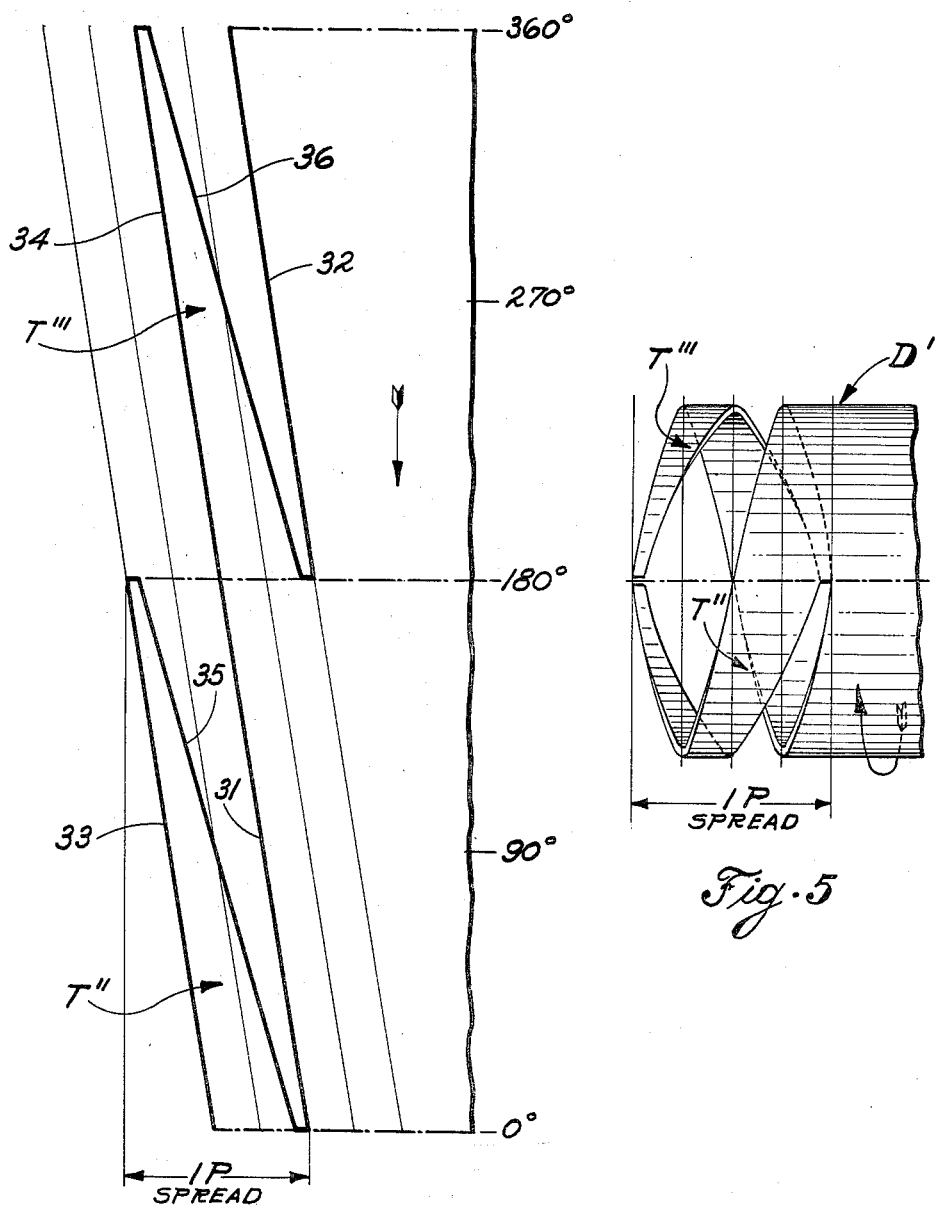

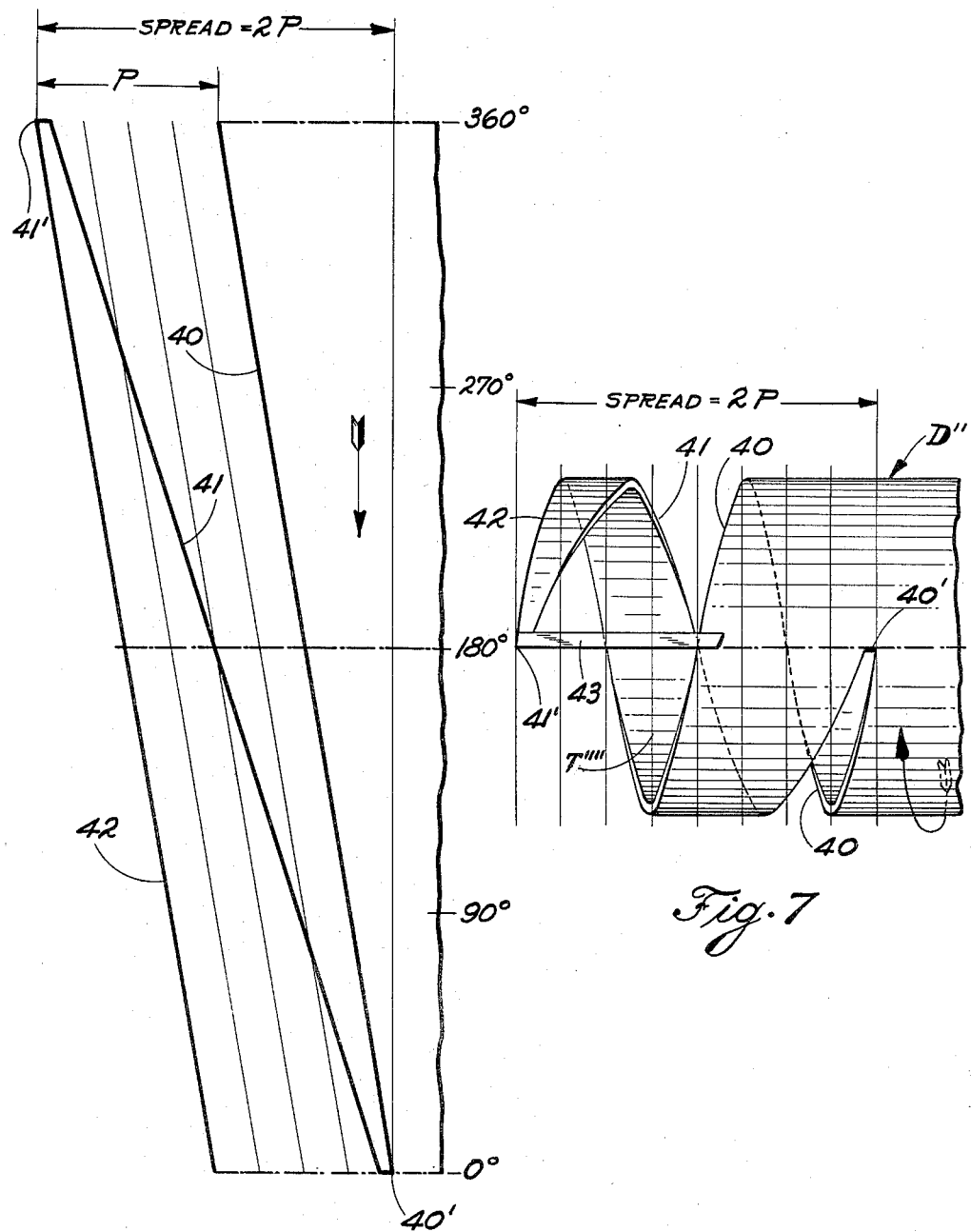

2,822,076

CHARGE DISTRIBUTING MEANS FOR ROTATABLE DRUMS

John F. Baier, Cleveland, Ohio, assignor to Arthur G. McKee & Company, Cleveland, Ohio, a corporation of Delaware Application January 26, 1956, Serial No. 561,432

15 Claims. (Cl. 198—42)

This invention relates to rotatable drums supported with the axis of rotation thereof inclined whereby pellets, granules, particles or the like of material charged into the upper end will move along the bottom surface thereof at a rate which depends largely upon the particular material being handled and the angle of inclination of the axis of the drum. More particularly my invention relates to improved distributing means for the discharge end of a drum of this type whereby the discharged material will be spread in a direction axially of the drum during rotation thereof rather than being deposited all in one location as would be the case if the drum discharge end were cut off on a plane normal to the axis of rotation.

I have illustrated my invention as applied to a cylindrical drum for forming balls or pellets of moistened pulverized material, for example a moistened pulverized metallic ore or concentrate thereof. However it will be understood that my improved apparatus is adapted to be employed wherever it is desired to discharge material in the form of balls, particles, granules, nodules, etc., from a rotatable drum on to a receiving means such as a vibrating screen or conveyer belt.

It is among the objects of my invention to provide an improved charge distributing means for rotatable drums whereby the discharged material will be distributed over a greater area and a longer distance axially of the drum than is possible with previously proposed drum distribution means. Other objects of my invention include the provision of charge distributing means for rotatable drums whereby, by design modifications hereinafter explained, the material discharged may be spread axially during each revolution of the drum for varying distances, i. e., from a distance which is considerably shorter than the forward movement of the material during one revolution to a distance which is substantially greater than said forward movement; the provision of an improved drum discharge end structure which will discharge material largely during certain portions only of each revolution of the drum whereby, during non-discharge periods, the previously discharged material may be screened or transported away from the point of discharge by a conveyer belt or the like; and the provision of an improved drum discharge means which is particularly adapted for the handling of moist and relatively soft pellets of pulverized metallic ore or concentrates thereof and which prevents undesirable piling up and sticking together of the individual pellets at the point of discharge.

The above and other objects of my invention will appear from the following description of several embodiments thereof, reference being had to the accompanying drawings in which:

Figure 1 is a side elevational view of a balling drum for forming pellets of moistened pulverized ore concentrate having my improved charge distributing apparatus incorporated therein.

Figure 2 is an end view of the apparatus shown in Figure 1, taken substantially on line 2—2 of Figure 1.

Figure 3 is a plan view of the discharge end of a drum provided with one form of my improved distributing apparatus.

Figure 4 is a development of the discharge end of the drum shown in Figure 3.

Figure 5 is a view similar to view 3 but showing a modified charge distributing end formation whereby the charge is distributed through a greater axial distance and for a greater part of a revolution than with the apparatus of Figure 3.

Figure 6 is a development of the discharge end of the drum of Figure 5.

Figure 7 is a view generally similar to Figures 3 and 5 but illustrating still another modification of my invention whereby a still greater axial spread of material from the discharge end of the drum is obtained.

Figure 8 is a development of the discharge end of the drum of Figure 7.

Figure 9 is a view generally similar to Figure 3 but illustrating a modified structure whereby spill-off from the extreme outer edges of the drum discharge end structure may be prevented or reduced.

Figure 10 is a view generally similar to Figure 3 but illustrating a modified drum end construction whereby the material being handled is discharged or distributed from both the inner and outer edges of the tongues.

Referring now to Figure 1, the drum D is an elongated tubular cylindrical structure open at both ends and supported with its axis of rotation inclined to the horizontal as indicated. Suitable supports 1 and frame structure 2 are provided to elevate the drum above the level of the floor 3. The track rings 4 and 5 encircle and are secured to the drum D and, as seen in Figure 2, are supported on spaced rolls 6 and 7. End thrust rolls 8 and 9, with their axes normal to the axis of the rotation of the drum, are provided to support the drum axially. Rotation of the drum is effected by motor 10 which drives a pinion 11 through a suitable gear box 12. This drum driving apparatus is carried by the frame 2 and the pinion meshes with a large ring gear 13 which encircles and is secured to the drum D. Thus when the motor 10 is driven in the proper direction the drum will be rotated about its longitudinal axis.

A conveyer belt is diagrammatically illustrated at 14 and is positioned to discharge material into the upper (right hand) or charging end of the drum D and such material, due to the inclination and rotational movement of the drum, will travel axially therethrough on the lower portion of the inner wall thereof at a rate which will be determined by the angle of inclination of the drum; the particular properties of the material being handled, i. e., particle size, moisture content, etc., and, to a certain degree, the speed of rotation of the drum.

In the formation of pellets of moistened pulverized ore or the like, material is charged into the upper end of the drum and a coating of the moist mud-like material is formed on the entire inner surface of the drum. A cutter bar, not shown, may be supported to extend through the drum from end to end to maintain the thickness of this inner coating at the desired value. Also fed into the upper entering end of the drum are seed particles or pellets of smaller size than ultimately desired. As the drum rotates these seed particles are rolled over the surface of the moist material in the drum and pick up in snowball fashion additional material whereby their size is increased. The pellets also travel longitudinally through the drum and, for a given material, drum speed and inclination of the bottom surface of the drum, these pellets will travel along the drum substantially the same distance for each revolution of the drum. This disance of advance of the material particles per revolution at the discharge end may be referred to as the pitch and is indicated by the reference character P on the drawings. It will be understood that this pitch may vary for different conditions and materials and in designing my improved charge distributing apparatus the pitch for the particular material and drum should first be determined and taken into consideration as will later appear.

As shown in the drawings the drum is cylindrical but it might of course be made frusto-conical or of other longitudinal configuration. In a cylindrical drum the pitch or distance of advance per revolution would be substantially constant from the inlet end to the discharge end but in drums of varying diameter or wherein the angle of inclination of the lowermost portion varies longitudinally, the advance per revolution or pitch would vary at different longitudinal locations in the drum. However it is the rate or distance of advance or travel per revolution at the discharge end of the drum which must be taken into consideration in designing my improved distributing apparatus, and where the terms "pitch," "travel" or "advance" are used herein it is understood that they refer to that which obtains at the discharge end of the drum.

When the material moving through the drum D reaches the lower (left hand) or discharge end it drops out of the drum on to a vibrating screen S which is also inclined to the horizontal as seen in Figure 2 and mounted on suitable supports 15 and 15'. Any suitable means, indicated schematically at 16, may be employed for vibrating the screen S. It will be apparent that the pellets which are discharged from the lower end of the drum D will travel down the vibrating screen S to the lower (right hand in Figure 2) end thereof during which travel the undersized pellets will pass through the screen on to a suitable conveyer (not shown) for return to the charging end of the drum D. The properly sized pellets which have not passed through the screen S will be discharged therefrom onto the conveyer belt 17 which transports them to the next stage of the process.

Although I have illustrated the drum as discharging onto an inclined vibrating screen S it will be understood that in some applications it might be desirable to deposit the discharge from the drum on a conveyer belt or other similar apparatus and, as will appear more fully later, my invention is desirable for such applications because it spreads the material for a substantial distance in a direction axially of the drum. This same feature is of course extremely desirable in case of discharge to a vibrating screen as it greatly facilitates rapid and complete screening of the material as it eliminates piling up of the material in a single location with resulting sticking together of the moist pellets in large gobs or bunches which prevent effective screening thereof.

Referring now to Figures 3 and 4, Figure 3 may be considered to be an enlarged plan view of the discharge end of the drum D shown in Figures 1 and 2. In this view the distance P represents the travel of a single particle or pellet axially in the drum D during one revolution thereof. For purposes of illustration this distance P has been divided into four parts, each of which represents the advance or axial travel of a particle in the drum during one-fourth revolution. The discharge distributing means of Figure 3 comprises a pair of opposed tapered tongue members T and T'. These tongues T and T' are aligned with and lie within an extension of the wall of the body of the drum D. Each tongue has a root portion 18 and a tip portion 19, the root portions being joined to the body of the drum. As clearly seen in Figure 4 each tongue T and T' extends through 90 degrees of the circumference of the drum.

The discharge end of the drum D also includes a pair of helical end edge portions 20 and 21, extending respectively from starting points 20' and 21' at the discharge end of the body of the drum (Figure 4). The outer edge 22 of tongue T is an extension of helical end portion 21 and is parallel to the drum end edge 20 while the outer edge 23 of tongue T' is an extension of helical end portion 20 and parallel to end portion 21.

Tongue T has an inner or distributing edge 24 which extends from the outer or tip end portion 19 thereof helically, at a greater angle of inclination than its outer edge 22, back to the end edge portion 20 of the drum body at the starting point 20' thereof. For structural reasons the tips of the tongues and the junction thereof with the body are preferably not brought to a sharp point but are squared off slightly as indicated at 25 and 26 (Figure 4). The tongue T' is identical to the tongue T and has a distributing edge 26 extending from the tip 19 thereof back to the end edge 21 of the drum body at its starting point 21'. When the developed end formation shown in Figure 4 is rolled into cylindrical form, as by lifting both ends of the developed view and bringing them together, the structure shown in Figure 3 results.

In describing the operation of this apparatus to distribute material from the discharge end of the drum it should be kept in mind that the material advances axially of the drum the distance indicated at P in a single revolution of the drum. It will be observed that the helix angles of the helical end edge portions 20 and 21 of the drum and outer edges 22 and 23 of the tongues T and T' are such that these edges, during rotation of the drum in the direction of the arrow in the drawings, advance at substantially the same rate as the material in the bottom portion of the drum and may be described as lying on a pitch line of the material being handled.

Thus a particular pellet, indicated on Figure 4 at 27, will travel, during rotation of the drum through 90 degrees in the direction of the arrow, to the point 27' and will have advanced axially a distance equal to one-fourth P during this 90 degrees of rotation of the drum. In effect the pellet 27 would stay right at the end edge 21 until the drum has been rotated through 180 degrees at which time it reaches the point 27" (indicated both at the upper and lower ends of the developed view of Figure 4). At this point the pellet enters the tongue T and will stay at the outer edge 22 thereof through a further 90 degrees of rotation at which time it reaches point 27'" and thereupon drops off from the tip of the tongue on to screen S.

In operation there are, of course, a succession of pellets following one another down the inner bottom surface of the drum. These pellets are continually advancing toward the end edges 20 and 21 of the drum but, except for possible drop-off of a relatively small number of pellets which may be due to lack of full coordination of the rate of axial pellet travel and the helix angles of the drum edges, they do not drop off from these edges, nor from the outer edges 22 and 23 of tongues T and T', because all of these helical edges advance at substantially the same rate as the pellets. When the root portion 18 of tongue T' is at the bottom of the drum during rotation thereof (as illustrated in Figures 3 and 4) there will be a series of pellets extending thereacross out to the outer edge 23 of the tongue. The outermost of these pellets is indicated at 29 in Figure 4 and rotation in the direction of the arrow through the first 90 degrees will result in the pellet 29 arriving at point 29' at the tip end of tongue T'. The pellets between pellets 29 and 27 will, during this first 90 degrees of rotation of the drum, drop off successively from the distributing edge 26 of tongue T' as suggested by the small arrows along edge 26 and will, as indicated on Figures 3 and 4, be spread in a direction axially of the drum for a distance equal to three-fourths P. During this first 90 degrees of rotation the pellets following pellet 27 will advance until pellet 28 reaches point 28'. As the second 90 degrees of rotation occurs pellet 28 advances to point 28" while during the third 90 degrees the pellets indicated at 27" to 28" will successively drop off from distributing edge 24 of tongue T and be deposited on screen S in a line parallel to the drum axis and approximately three-fourths P in length.

From the above explanation it will be understood that pellets will be discharged from the distributing edges 24 and 26 of tongues T and T' during every other 90 degrees of rotation of the drum while during the intermediate 90 degrees of rotation there will theoretically be no discharge of pellets from the drum. Of course in actual operation absolute coordination of the helix angles of the edges and the speed of advance of the pellets may not be possible so that there may be some discharge from the end edge portions of the drum body and the outer edges of the tongues.

As noted above the axial length of the path of distribution of the pellets from the tongues T and T' is equal substantially to three-fourths P with the arrangement shown in Figures 3 and 4. Furthermore the pellets are being distributed during a total of 180 degrees out of each full revolution of the drum. This results in a materially better distribution pattern than can be obtained by any arrangement using mere scallops or projections as distinguished from trailing or re-entrant distributing tongues as described herein.

In Figures 5 and 6 a modified charge distributing end for a rotatable drum is illustrated. This embodiment of my invention is somewhat similar to that shown in Figures 3 and 4 but varies therefrom in that the tongues T'' and T''' each extend circumferentially through 180 degrees of the circumference of the drum D'. The drum end edge portions 31 and 32 extend helically on the pitch line of the material travelling through the drum in the same manner as explained in reference to Figures 3 and 4 and the outer edges 33 and 34 of tongues T'' and T''' respectively constitute extensions of the drum end edge portions 32 and 31. The distributing edges 35 and 36 of tongues T'' and T''' extend from the outer tips of the tongues inwardly to join the adjacent end edge portions 31 and 32 respectively of the drum body. These inner or distributing edges 35 and 36 of the tongues may be defined as extending from the adjacent end edge portions of the drum to the outer edges of the tongues in a direction opposite to the direction of rotation of the drum. Thus in Figure 6 the direction of rotation of the drum is indicated by the downwardly pointed arrow while the distributing edge 36 of tongue T''' extends upwardly (opposite to the direction of rotation) from the adjacent end edge portion 32 of the drum to the outer edge 34 of tongue T''. The outer edges 33 and 34 of the tongues are substantially parallel to the adjacent end edge portions 31 and 32 of the drum body.

The tongues have their wide root portions joined to the body portion of the drum and the tapering tip portions extending circumferentially in a direction opposite to the direction of rotation of the drum. Thus when the apparatus is in operation the tapered tongues may be described as "trailing" as their large root ends move foremost.

The apparatus of Figures 5 and 6 will, as indicated on the drawings, distribute material for a distance axially of the drum equal to the distance P (through which the material advances in one revolution). Furthermore there will be no part of the rotation of the drum during which material will not be distributed therefrom because, as soon as distribution from tongue T'' is completed after 180 degrees of revolution, distribution from tongue T''' starts and continues for the next 180 degrees.

Still another modification of my improved drum charge distributing means is shown in Figures 7 and 8 wherein a single tongue T'''' extends through a full 360 degrees of the circumference of the drum. As in the previous embodiments, the end edge portion 40 of the body of the drum D'' has a starting point 40' and lies on a helix which corresponds to the pitch line of the material passing through the drum. The inner or distributing edge 41 of drum D'' extends helically from the outer edge 42 of tongue T'''' at the tip end thereof helically back to the end edge 40 of the drum at starting point 40'. A reinforcing bar or arm 43 may be employed to connect the extreme tip of tongue T'''' to the adjacent root portion thereof and, if necessary or desirable, other reinforcing members of similar nature can be applied to stiffen the distributing tongues in any of the embodiments of my invention illustrated herein.

With the apparatus of Figures 7 and 8 the pellets or other material are distributed axially of the drum for a distance equal to two P. Thus in a single revolution of the drum material will be discharged from the distributing edge 41 of the tongue T'''' from the point 40' at the inner end or root of the tongue to the point 41' at the outer tip of the tongue. This elongated distribution path will result in a relatively thin spreading of the pellets or the like on to the screen S and this lineal elongated distribution will be repeated during each revolution of the drum.

It has previously been noted that the helix angle or angle of advance of the end edge portions of a drum embodying my invention is preferably equal to the rate of advance or pitch of the material passing through the drum. With such an arrangement, as also previously noted, the pellets or the like will theoretically stay right at the outer edges of the drum end portion. In practice however this theoretical operation may not obtain and, to assist in preventing drop-off from the end edge portions of the drum body and the outer edges of the distributing tongues, the structures illustrated may be modified as indicated in Figure 9 when and if such drop-off is undesirable. This view follows Figure 3 and the curved dot-dash lines are identical to the drum end edge portions and tongue outer edges shown in Figure 3. In Figure 9 however the end edge portions 45 and 46 are axially offset in a down-stream direction from the theoretical dot and dash pitch lines. Thus, with the apparatus of Figure 9, material passing through the drum will be disposed along the bottom portion thereof and theoretically would never travel beyond the dot-dash pitch lines and thus would all be discharged from the distributing edges 47 and 48 of the tongues. The extension of the structure beyond these theoretical pitch lines will serve to prevent spill-over or drop-off from the outer edges. As an alternative, to assist in preventing drop-off from the outer edges of drums incorporating my invention, inwardly projecting flanges may be secured along these edges from the starting points of the drum end edge portions out to the tip ends of the outer edges of the tongues. Whether or not either of the alternatives referred to above are employed will depend upon the type of material being handled and other operational factors.

In Figure 10 I have illustrated a modified form of the trailing distributing tongues of my improved drum end construction. This view illustrates the same general arrangement as shown in Figure 3, i. e., each of the two tongues extending through 90 degrees of the circumference of the discharge end of the drum and, in order more clearly to indicate the difference between the structure of Figure 10 and that of Figure 3 the tongues of Figure 3 have been indicated on Figure 10 in dot and dash lines. As previously explained in discussing Figure 3, the outer edge 22 of tongue T and the outer edge 23 of tongue T' are extensions of the helical end portions of the drum and are parallel respectively to the end portions 20 and 21. In the embodiment of Figure 10 the tongue 50 has an outer end edge portion 51 and an inner edge portion 52 and, similarly, the tongue 53 has an end edge portion 54 and an inner edge portion 55. As distinguished from the structure of Figure 3 however the outer end edge portions 51 and 54 of tongues 50 and 53 are extensions of but are not parallel to the drum end portions 56 and 57 but rather converge thereto. The inner or distributing edges of the tongues 50 and 53 extend from the tips of the tongues back to the starting points of the drum end portions but at a lesser angle than was the case in the structure of Figure 3. The result of the tongue form shown in Figure 10 will be that the pellets or the like which are discharged from the tongues during rotation of the drum will be discharged and distributed not only from the inner edges 52 and 55 of the tongues 50 and 53 but also from the outer end edges 51 and 54 thereof. This type of distribution, although it gives a smaller length of spread of the material than was the case in the apparatus of Figure 3, may be desirable for some types of materials and applications. It will be understood that the angle of convergence of the outer edges of the tongues toward the drum end edges may be varied as desired with corresponding variation of the angle of the inner tongue edges. It will also be understood that in some instances it may be desirable to provide a plurality of distributing tongues the edges of some of which extend at different angles relative to the helical end edges of the drum than do the edges of others, thus further varying the discharge pattern.

Although I have described the illustrated embodiments of my invention in considerable detail it will be understood that variations and modifications may be made in my drum discharge apparatus without departing from the spirit of my invention. For example, it is not essential that the drum be cylindrical as my invention is adapted to effect discharge from drums which are of varying diameter at different longitudinal locations such as frusto-conical or partially cylindrical and partially frusto-conical in form. Accordingly, I do not wish to be limited to the exact structures herein shown and described but claim as my invention all embodiments thereof coming within the scope of the appended claims.

I claim:

1. Charge distributing means for an inclined rotatable drum structure on the lower inner surface of which material is adapted to travel in an axial direction during rotation thereof in one direction, said drum having an open lower end from which said material is discharged, including, a helical end edge portion extending circumferentially of said drum from a starting point at said lower end thereof, and a trailing distributing tongue at said lower end of said drum, said tongue having a root portion joined to said drum and a tip portion extending from said root portion in a direction opposite to said direction of rotation of said drum and axially spaced from said drum end edge.

2. Charge distributing means for an inclined rotatable drum structure on the lower inner surface of which material is adapted to travel in an axial direction during rotation thereof in one direction including, an end edge portion extending from a starting point at the lower end of said drum circumferentially thereof at an angle to a plane normal to the axis of rotation of said drum, and a tapered trailing distributing tongue at said lower end of said drum, said tongue having an outer edge substantially parallel to said end edge portion of said drum and an inner edge extending from said end edge portion of said drum circumferentially in a direction opposite to said direction of rotation to said outer edge of said tongue whereby material traveling through said drum during rotation thereof in said one direction will be discharged from said inner edge of said tongue.

3. Charge distributing means for an inclined rotatable drum structure on the lower inner surface of which material is adapted to travel in an axial direction during rotation thereof in one direction including, a plurality of end edge portions extending respectively from spaced starting points at the lower end of said drum circumferentially thereof at an angle to a plane normal to the axis of rotation of said drum, and a plurality of tapered trailing distributing tongues at said lower end of said drum, said tongues each having an outer edge substantially parallel to an adjacent end edge portion of said drum and an inner edge extending from said adjacent end edge portion of said drum circumferentially in a direction opposite to said direction of rotation to said outer edge whereby material traveling through said drum during rotation thereof in said one direction will be discharged from said inner edges of said tongues.

4. In a rotatable drum having a discharge end lower than its other end whereby a given material therein will travel axially at said discharge end a given distance during one revolution of said drum, charge distributing means including, a plurality of end edge portions on said drum extending helically respectively from circumferentially spaced starting points at said discharge end, the helix angle of said end edge portions being such that each said end edge portion, at points thereon circumferentially spaced from its starting point, will be disposed a distance axially from its starting point equal substantially to the distance said material would travel axially at said discharge end of said drum during rotation through an arc equal to the angular distance from said starting point to said circumferential point in a direction opposite to the direction of rotation of said drum, and a plurality of trailing distributing tongues one spaced axially from each of said end edge portions and extending from said starting points in a direction opposite to the direction of rotation of said drum, the outer edges of said tongues being substantially parallel to the adjacent end edge portions of said drum, and the axial width of said tongues being greatest at said starting points and diminishing to the outer ends thereof.

5. In a rotatable drum having a discharge end lower than its other end whereby a given material therein will travel axially a given distance at said discharge end during one revolution of said drum, charge distributing means including, a plurality of end edge portions on said drum extending helically respectively from circumferentially spaced starting points at said discharge end, the helix angle of said end edge portions being such that each said end edge portion, at points thereon circumferentially spaced from its starting point, will be disposed a distance axially from its starting point equal at least to the distance said material would travel axially at said discharge end of said drum during rotation through an arc equal to the angular distance from said starting point to said circumferential point in a direction opposite to the direction of rotation of said drum, and a plurality of trailing distributing tongues one spaced axially from each of said end edge portions and extending from said starting points in a direction opposite to the direction of rotation of said drum, the axial width of said tongues being greatest at said starting points and diminishing to the outer ends thereof.

6. In combination with a rotatable drum having a body portion supported with its discharge end lower than its other end whereby a given material charged therein will travel axially at said discharge end a given distance during one revolution of said drum, said drum being adapted to be rotated in one direction, charge distributing means including an end edge portion on said drum extending helically at said discharge end, and a tapered trailing distributing tongue having a root portion joined to said body portion and a tip portion extending circumferentially in a direction opposite to the direction of rotation of said drum, said tongue having an inner edge diverging from said end edge portion of said body portion in a direction opposite to the direction of rotation of said drum.

7. In combination with a rotatable drum having a body portion supported with its discharge end lower than its other end whereby a given material charged therein will travel axially a given distance at said discharge end during one revolution of said drum, said drum being adapted to be rotated in one direction, charge distributing means including a plurality of circumferentially spaced end edge portions on said drum extending helically at said discharge end, and a corresponding number of substantially identical tapered trailing distributing tongues each having a root portion joined to said body portion and a tip portion extending circumferentially in a direction opposite to the direction of rotation of said drum, said tongues each having an inner edge diverging from the adjacent end edge portion of said body portion in a direction opposite to the direction of rotation of said drum, and said tongues each having an outer edge comprising an extension of an end edge portion of said body portion.

8. In combination with a rotatable drum having a body portion supported with its discharge end lower than its other end whereby a given material charged therein will travel axially at said discharge end a given distance during each revolution of said drum, means for rotating said drum in one direction, charge distributing means including an end edge portion on said drum extending helically at said discharge end of said body portion at an angle such that, at any point thereon spaced circumferentially from a starting point, said end edge portion will be disposed a distance axially from said starting point equal substantially to the distance said material would travel axially at said discharge end of said drum during rotation through an arc equal to the angular distance from said starting point to said circumferentially spaced point in a direction opposite to the direction of rotation of said drum, and a tapered trailing distributing tongue having a root portion joined to said body portion and a tip portion extending circumferentially in a direction opposite to said direction of rotation of said drum, said tongue having an inner edge diverging from said end edge portion of said body portion in a direction opposite to the direction of rotation of said drum.

9. In combination with a rotatable drum having a body portion supported with its discharge end lower than its other end whereby a given material charged therein will travel axially at said discharge end a given distance during each revolution of said drum, means for rotating said drum in one direction, charge distributing means including an end edge portion on said drum extending helically at said discharge end of said body portion at an angle such that, at any point thereon spaced circumferentially from a starting point, said end edge portion will be disposed a distance axially from said starting point equal at least to the distance said material would travel axially at said discharge end of said drum during rotation through an arc equal to the angular distance from said starting point to said circumferentially spaced point in a direction opposite to the direction of rotation of said drum, and a tapered trailing distributing tongue having a root portion joined to said body portion and a tip portion extending circumferentially in a direction opposite to said direction of rotation of said drum, said tongue having an inner edge diverging from said end edge portion of said body portion in a direction opposite to the direction of rotation of said drum.

10. In combination with a rotatable drum having a body portion supported with its discharge end lower than its other end whereby a given material charged therein will travel axially at said discharge end a given distance during one revolution of said drum, said drum being adapted to be rotated in one direction, charge distributing means including an end edge portion on said drum extending helically at said discharge end of said body portion, and a tapered trailing distributing tongue having an outer edge comprising an extension of said helical end edge portion of said drum and an inner edge converging toward said outer edge in a direction opposite to the direction of rotation of said drum.

11. In combination with a rotatable drum having a body portion supported with its discharge end lower than its other end whereby a given material charged therein will travel axially at said discharge end a given distance during one revolution of said drum, said drum being adapted to be rotated in one direction, charge distributing means including an end edge portion on said drum extending helically at said discharge end of said body portion, and a tapered trailing distributing tongue having an outer edge comprising an extension of said helical end edge portion of said drum and an inner edge converging toward said outer edge in a direction opposite to the direction of rotation of said drum, the axial width of said tongue being greatest at its inner end adjacent said body portion and diminishing to the outer end thereof.

12. In combination with a rotatable drum having a body portion supported with its discharge end lower than its other end whereby a given material therein will travel axially at said discharge end a given distance during one revolution of said drum, said drum being adapted to be rotated in one direction, charge distributing means including an end edge portion on said drum extending helically at said discharge end of said body portion at an angle such that said end edge portion, at any circumferentially spaced point from a starting point, will be disposed a distance axially from said starting point equal substantially to the distance said material would travel axially at said discharge end of said drum during rotation through an arc equal to the angular distance from said starting point to said circumferentially spaced point in a direction opposite to the direction of rotation of said drum, and a trailing distributing tongue having an outer edge comprising an extension of said helical end edge portion of said drum and an inner edge converging toward said outer edge in a direction opposite to the direction of rotation of said drum.

13. Charge distributing means for a rotatable drum supported with its discharge end lower than its other end whereby a given material charged therein will travel axially at said discharge end a given distance during each revolution of said drum in one direction including, an end edge portion on said drum extending from a starting point at said discharge end thereof helically to an outer extremity at an angle such that, at any particular point thereon spaced circumferentially from said starting point, said end edge portion will be disposed a distance axially from said starting point equal substantially to the distance said material would travel axially at said discharge end of said drum during rotation through an arc equal to the annular distance from said starting point to said particular point in a direction opposite to said direction of rotation of said drum, and a trailing distributing edge portion on said drum extending from said outer extremity of said end edge portion back to said discharge end of said body portion.

14. Charge distributing means for a rotatable drum supported with its discharge end lower than its other end whereby a given material charged therein will travel axially at said discharge end a given distance during each revolution of said drum in one direction including, an end edge portion on said drum extending from a starting point at said discharge end thereof helically to an outer extremity at an angle such that, at any particular point thereon spaced circumferentially from said starting point, said end edge portion will be disposed a distance axially from said starting point equal substantially to the distance said material would travel axially at said discharge end of said drum during rotation through an arm equal to the angular distance from said starting point to said particular point in a direction opposite to said direction of rotation of said drum, and a trailing distributing edge portion on said drum extending from said outer extremity of said end edge portion back to said discharge end of said body portion at a point lying on a plane normal to the axis of rotation of said drum and passing through said starting point.

15. Charge distributing means for a rotatable drum supported with its discharge end lower than its other end whereby a given material charged therein will travel axially at said discharge end a given distance during each revolution of said drum in one direction including, an end edge portion on said drum extending from a starting point at said discharge end thereof helically to an outer extremity at an angle such that, at any particular point thereon spaced circumferentially from said starting point, said end edge portion will be disposed a distance axially from said starting point equal substantially to the distance said material would travel axially at said discharge end of said drum during rotation through an arc equal to the angular distance from said starting point to said particular point in a direction opposite to said direction of rotation of said drum; and a trailing distributing edge portion on said drum extending in the direction of rotation of said drum from said outer extremity of said end edge portion back to said discharge end of said body portion at a point lying on a plane normal to the axis of rotation of said drum and passing through said starting point.

References Cited in the file of this patent
UNITED STATES PATENTS 2,707,304    Haley _____ May 3, 1955